United States Patent
Park et al.

(10) Patent No.: US 9,551,252 B2
(45) Date of Patent: Jan. 24, 2017

(54) SYSTEM AND METHOD OF PURIFYING EXHAUST GAS PROVIDED WITH LEAN NOX TRAP AND SELECTIVE CATALYTIC REDUCTION CATALYST

(71) Applicants: HYUNDAI MOTOR COMPANY, Seoul (KR); FEV GMBH, Aachen (DE)

(72) Inventors: Jin Woo Park, Suwon-si (KR); Jin Ha Lee, Seoul (KR); Alexander Vovk, Aachen (DE); Joschka Schaub, Aachen (DE); Thomas Wittka, Kornelimünster (DE)

(73) Assignees: HYUNDAI MOTOR COMPANY, Seoul (KR); FEV GMBH, Aachen (DE)

( * ) Notice: Subject to any disclaimer, the term of this patent is extended or adjusted under 35 U.S.C. 154(b) by 0 days.

(21) Appl. No.: 14/956,228

(22) Filed: Dec. 1, 2015

(65) Prior Publication Data
US 2016/0290199 A1    Oct. 6, 2016

(30) Foreign Application Priority Data
Mar. 30, 2015   (KR) ........................ 10-2015-0044458

(51) Int. Cl.
*F01N 3/00*       (2006.01)
*F01N 3/20*       (2006.01)
(Continued)

(52) U.S. Cl.
CPC ............... *F01N 3/208* (2013.01); *F01N 3/035* (2013.01); *F01N 3/0814* (2013.01); *F01N 3/0842* (2013.01); *F01N 3/206* (2013.01); *F01N 9/002* (2013.01); *F01N 2250/02* (2013.01); *F01N 2250/14* (2013.01); *F01N 2560/025* (2013.01);
(Continued)

(58) Field of Classification Search
USPC .......... 60/274, 276, 286, 295, 297, 301, 303
See application file for complete search history.

(56) References Cited

U.S. PATENT DOCUMENTS

| 8,112,987 B2 * | 2/2012 | Bailey .................... B01D 53/90 60/286 |
| 8,516,798 B2 * | 8/2013 | Dobson ................... F01N 3/035 60/286 |

(Continued)

FOREIGN PATENT DOCUMENTS

| JP | 2001-115827 A | 4/2001 |
| JP | 2006-183599 A | 7/2006 |

(Continued)

*Primary Examiner* — Binh Q Tran
(74) *Attorney, Agent, or Firm* — McDermott Will & Emery LLP

(57) ABSTRACT

A system for purifying an exhaust gas includes an engine, a lean NOx trap (LNT) mounted on the exhaust pipe, a dosing module mounted at the exhaust pipe downstream of the LNT, a selective catalytic reduction (SCR) catalyst mounted at the exhaust pipe downstream of the dosing module, and a controller for performing a denitrification (DeNOx) share between the LNT and the SCR catalyst according to a driving condition of the engine, wherein the controller predicts a NOx purifying ratio of the SCR catalyst according to the driving condition of the engine and adjusts a regeneration efficiency of the LNT based on an actual NOx purifying ratio of the SCR catalyst.

20 Claims, 7 Drawing Sheets

(51) Int. Cl.
*F01N 9/00* (2006.01)
*F01N 3/08* (2006.01)
*F01N 3/035* (2006.01)

(52) U.S. Cl.
CPC ...... *F01N 2560/026* (2013.01); *F01N 2560/06* (2013.01); *F01N 2560/08* (2013.01); *F01N 2610/02* (2013.01); *F01N 2900/1402* (2013.01); *F01N 2900/1404* (2013.01); *F01N 2900/1406* (2013.01)

(56) References Cited

U.S. PATENT DOCUMENTS

| | | | |
|---|---|---|---|
| 8,635,855 B2* | 1/2014 | Mital | F01N 3/035 60/274 |
| 8,839,612 B2* | 9/2014 | Scherer | F01N 3/0842 60/301 |
| 8,875,497 B2* | 11/2014 | Matsunaga | F02D 41/0055 60/285 |

FOREIGN PATENT DOCUMENTS

| | | |
|---|---|---|
| KR | 10-2012-0008521 A | 1/2012 |
| KR | 10-2013-0057843 A | 6/2013 |

* cited by examiner

SYSTEM AND METHOD OF PURIFYING EXHAUST GAS PROVIDED WITH LEAN NOX TRAP AND SELECTIVE CATALYTIC REDUCTION CATALYST

CROSS-REFERENCE TO RELATED APPLICATION

This application claims the benefit of priority to Korean Patent Application No. 10-2015-0044458 filed in the Korean Intellectual Property Office on Mar. 30, 2015, the entire contents of which are incorporated herein by reference.

TECHNICAL FIELD

The present disclosure relates to a system and method of purifying an exhaust gas provided with a lean NOx trap (LNT) and a selective catalytic reduction (SCR) catalyst, and more particularly, to a system of purifying an exhaust gas and a method of controlling the same that can improve purifying efficiency of nitrogen oxide during all driving conditions.

BACKGROUND

Generally, exhaust gas flowing out from an engine through an exhaust manifold is driven into a catalytic converter mounted at an exhaust pipe, and is purified therein. After that, noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter, and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reactions with the reducing agents.

Recently, a lean NOx trap (LNT) catalyst has been used as such a DeNOx catalyst. The LNT catalyst adsorbs the NOx contained in the exhaust gas when an air/fuel ratio is lean, and releases the adsorbed NOx and reduces the released nitrogen oxide and the nitrogen oxide contained in the exhaust gas when the air/fuel ratio is rich.

If a temperature of the exhaust gas, however, is high (e.g., the temperature of the exhaust gas is higher than 400° C.), the LNT cannot purify the nitrogen oxide contained in the exhaust gas. Particularly, if a particulate filter for trapping particulate matter (PM) contained in the exhaust gas is regenerated or sulfur poisoning the LNT is removed, the temperature of the exhaust gas increases. Therefore, the nitrogen oxide contained in the exhaust gas is not purified, but is exhausted to the exterior of the vehicle.

Recently, as exhaust regulations become tightened in most countries, a system of purifying an exhaust gas provided with an additional DeNOx catalyst (e.g., selective catalytic reduction (SCR) catalyst) together with the LNT has been developed. Since operating regions of the LNT and the SCR catalyst overlap with each other, however, it is hard to achieve a target purifying ratio. According to experiments, if the LNT and the SCR catalyst are not controlled by a specific strategy, a purifying ratio is increased by 10%-20% compared with a purifying ratio of any one of the LNT and the SCR catalyst. Therefore, tightened exhaust regulations cannot be met. Therefore, optimum control of the LNT and the SCR catalyst are necessary.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a system of purifying an exhaust gas and a method of controlling the same having advantages of improving purifying efficiency of nitrogen oxide at entire driving conditions through optimal control of an LNT and an SCR catalyst.

A system of purifying an exhaust gas according to an exemplary embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; a dosing module mounted at the exhaust pipe downstream of the LNT and configured to directly injects reducing agent into the exhaust gas; a selective catalytic reduction (SCR) catalyst mounted at the exhaust pipe downstream of the dosing module and configured to reduce the nitrogen oxide contained in the exhaust gas using the reducing agent injected from the dosing module; and a controller configured to perform a denitrification (DeNOx) share between the LNT and the SCR catalyst according to a driving condition of the engine, wherein the controller is configured to predict a NOx purifying ratio of the SCR catalyst according to the driving condition of the engine and to adjust a regeneration efficiency of the LNT based on an actual NOx purifying ratio of the SCR catalyst when the predicted NOx purifying ratio of the SCR catalyst is between a minimum threshold purifying ratio and a maximum threshold purifying ratio.

The controller may be configured to control DeNOx using the LNT when the predicted NOx purifying ratio of the SCR catalyst is smaller than the minimum threshold purifying ratio.

The controller may be configured to control DeNOx using the SCR catalyst if the predicted NOx purifying ratio of the SCR catalyst is larger than the maximum threshold purifying ratio.

The controller may be configured to adjust the regeneration efficiency of the LNT based on an actual purifying ratio of the SCR catalyst when the DeNOx using the LNT is necessary during controlling the DeNOx using the SCR catalyst.

The controller may be configured to reduce the regeneration efficiency of the LNT when the actual NOx purifying ratio of the SCR catalyst is larger than the predicted NOx purifying ratio of the SCR catalyst or a value related thereto.

The reduction of the regeneration efficiency of the LNT may be performed by setting a target lambda to be larger than or equal to a predetermined lambda when regeneration, setting a regeneration duration to be shorter than a predetermined duration, setting a regeneration period to be longer than a predetermined period, or combination thereof.

The controller may be configured to increase the regeneration efficiency of the LNT when the actual purifying ratio of the SCR catalyst is smaller than or equal to the predicted NOx purifying ratio of the SCR catalyst or a value related thereto.

The increase of the regeneration efficiency of the LNT may be performed by setting a target lambda to be smaller than a predetermined lambda when regeneration, setting a regeneration duration to be longer than a predetermined duration, setting a regeneration period to be shorter than a predetermined period, or combination thereof.

The controller may determine that the DeNOx using the LNT is necessary when the NOx adsorbed in the LNT is larger than or equal to a predetermined NOx adsorption.

The predetermined NOx adsorption may be set to become increase as the predicted NOx purifying ratio of the SCR catalyst increases.

The controller may be configured to stop regeneration of the LNT if an LNT regeneration stop condition is satisfied during adjusting the regeneration efficiency of the LNT.

The LNT regeneration stop condition may be satisfied when the NOx adsorbed in the LNT is smaller than a minimum NOx adsorption.

The minimum NOx adsorption may be set to become increase as the predicted NOx purifying ratio of the SCR catalyst increases.

In various aspects, the system of purifying an exhaust gas may further include a particulate filter mounted at the exhaust pipe downstream of the dosing module and trapping particulate matter contained in the exhaust gas, wherein the SCR catalyst is coated on the particulate filter.

A method of controlling a system of purifying an exhaust gas according to another exemplary embodiment of the present disclosure is disclosed. The system of purifying an exhaust gas is provided with a lean NOx trap (LNT) and a selective catalytic reduction (SCR) catalyst.

The method may include: detecting a driving condition of an engine; predicting a NOx purifying ratio of the SCR catalyst according to the driving condition of the engine; comparing the predicted NOx purifying ratio with a minimum threshold purifying ratio and a maximum threshold purifying ratio; adjusting a regeneration efficiency of the LNT based on an actual NOx purifying ratio of the SCR catalyst when the predicted NOx purifying ratio is between the minimum threshold purifying ratio and the maximum threshold purifying ratio; performing DeNOx using the LNT when the predicted NOx purifying ratio is smaller than the minimum threshold purifying ratio; and performing DeNOx using the SCR catalyst when the predicted NOx purifying ratio is larger than or equal to the maximum threshold purifying ratio.

The adjusting a regeneration efficiency of the LNT based on an actual NOx purifying ratio of the SCR catalyst may include: performing DeNOx using the SCR catalyst; determining whether DeNOx using the LNT is necessary; performing DeNOx using the LNT if the DeNOx using the LNT is necessary; calculating the actual NOx purifying ratio of the SCR catalyst; comparing the actual NOx purifying ratio of the SCR catalyst with the predicted NOx purifying ratio of the SCR catalyst or a value related thereto; and increasing or reducing the regeneration efficiency of the LNT based on the comparison result.

The regeneration efficiency of the LNT may be reduced if the actual NOx purifying ratio of the SCR catalyst is larger than the predicted NOx purifying ratio of the SCR catalyst or the value related thereto.

The reduction of the regeneration efficiency of the LNT may be performed by setting a target lambda to be larger than or equal to a predetermined lambda when regeneration, setting a regeneration duration to be shorter than a predetermined duration, setting a regeneration period to be longer than a predetermined period, or combination thereof.

The regeneration efficiency of the LNT may be increased if the actual NOx purifying ratio of the SCR catalyst is smaller than or equal to the predicted NOx purifying ratio of the SCR catalyst or the value related thereto.

The increase of the regeneration efficiency of the LNT may be performed by setting a target lambda to be smaller than a predetermined lambda when regeneration, setting a regeneration duration to be longer than a predetermined duration, setting a regeneration period to be shorter than a predetermined period, or combination thereof.

As described above, a purifying efficiency of nitrogen oxide that is contained in an exhaust gas may be improved at entire driving conditions through optimal control of an LNT and an SCR catalyst.

DETAILED DESCRIPTION

An exemplary embodiment of the present disclosure will hereinafter be described in detail with reference to the accompanying drawings.

The technical spirit of the present disclosure is that a selective catalytic reduction (SCR) catalyst is configured to perform denitrification (DeNOx) and a lean NOx trap (LNT) is configured to perform auxiliary DeNOx in a system of purifying an exhaust gas provide with the LNT and the SCR catalyst. For these purposes, the exemplary embodiments of the present disclosure are configured to adjust a regeneration efficiency of the LNT according to a purifying ratio of the SCR catalyst.

Figure 1:
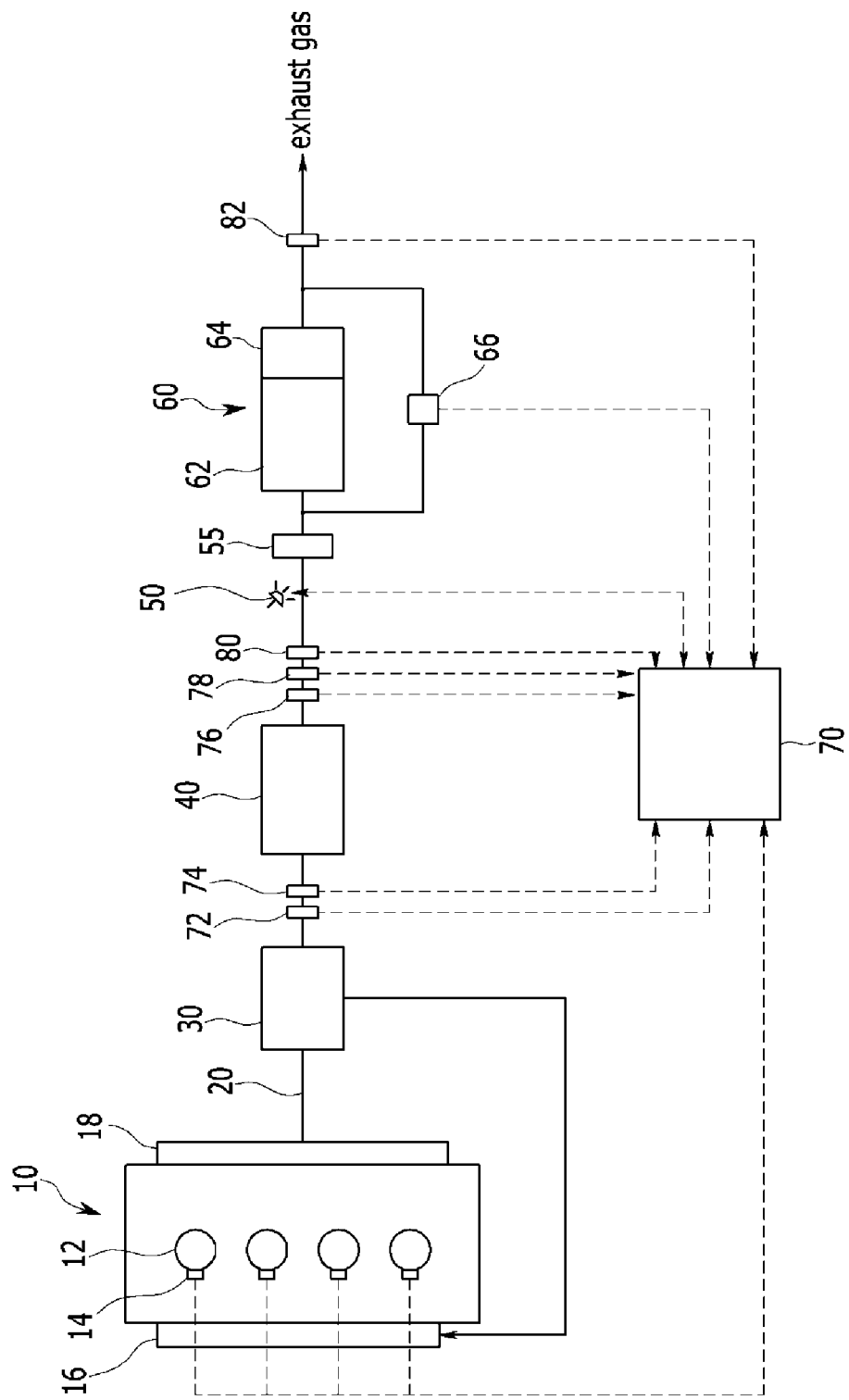
FIG. 1 is a schematic diagram of a system for purifying an exhaust gas according to an exemplary embodiment of the present disclosure.

FIG. 1 is a schematic diagram of a system of purifying an exhaust gas according to an exemplary embodiment of the present disclosure.

As shown in FIG. 1, an exhaust system for an internal combustion engine may include an engine 10, an exhaust pipe 20, an exhaust gas recirculation (EGR) apparatus 30, a lean NOx trap (LNT) 40, a dosing module 50, a particulate filter 60, and a controller 70.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in the combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbons, carbon monoxide, particulate matter, and nitrogen oxide contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling an amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor 72 may be mounted on the exhaust pipe 20 downstream of the exhaust gas recirculation apparatus 30. The first oxygen sensor 72 detects an oxygen amount in the exhaust gas passing through the exhaust gas recirculation apparatus 30 and transmits a signal corresponding thereto to the controller 70, so as to help lean/rich control of the exhaust gas performed by the controller 70. In this specification, the detected value by the first oxygen sensor 72 is called air/fuel ratio (lambda) at an upstream of the LNT.

In addition, a first temperature sensor 74 is mounted on the exhaust pipe 20 downstream of the exhaust gas recirculation apparatus 30 and detects a temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbons (HC) contained in the exhaust gas.

Herein, the hydrocarbons represents all compounds consisting of carbon and hydrogen contained in the exhaust gas and the fuel.

A second oxygen sensor 76, a second temperature sensor 78, and a first NOx sensor 80 may be mounted on the exhaust pipe 20 downstream of the LNT 40.

The second oxygen sensor 76 detects an oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called air/fuel ratio (lambda) at an upstream of the filter.

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70. The NOx concentration detected by the first NOx sensor 80 may be used to determine an amount of a reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia. For convenience of explanation, it is exemplified hereinafter that the ammonia is used as the reducing agent and the dosing module 50 injects the urea. However, it is to be understood that a reducing agent other than the ammonia is also included within the scope of the present disclosure without changing the spirit of the present disclosure.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction (SCR) catalyst 64, but is not limited thereto.

It is to be understood that an SCR catalyst in this specification and claim includes the SCR catalyst itself or the SDPF.

The SDPF 62 is formed by coating the SCR on walls defining channels of the DPF. Generally, the DPF includes a plurality of inlet channels and outlet channels. Each of the inlet channels includes an end that is open and an other end that is blocked, and receives the exhaust gas from a front end of the DPF. In addition, each of the outlet channels includes an end that is blocked and an other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 is mounted at the rear of the SDPF 62. The additional SCR catalyst 64 further reduces the nitrogen oxide if the SDPF 62 purifies the nitrogen oxide completely. The additional SCR catalyst 64 may be mounted physically apart from the SDPF 62.

Meanwhile, a pressure difference sensor 66 is mounted on the exhaust pipe 20. The pressure difference sensor 66 detects a pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than a predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects concentration of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate the performance of the particulate filter 60.

The controller 70 may determine a driving condition of the engine based on the signals transmitted from each sensor, and perform the lean/rich control and control the amount of the reducing agent injected by the dosing module 50 based on the driving condition of the engine. For example, the controller 70 may remove nitrogen oxide from the LNT 40 (in this specification, it will be called 'regeneration of LNT') by controlling the air/fuel ratio to be rich, and may remove nitrogen oxide from the SDPF 60 by injecting a reducing agent. The lean/rich control may be performed by controlling a fuel amount injected by the injector 14.

Meanwhile, the controller 70 calculates an inner temperature of the SDPF 62, an ammonia amount adsorbed in the SDPF 62, a NOx exhaust amount from the LNT 40, and so on based on a driving condition of the engine, and predicts a NOx purifying ratio of the SDPF 62. For these purposes, adsorbing/oxidizing characteristics of the ammonia according to the inside temperature of the particulate filter 60, releasing characteristics of the ammonia according to the inside temperature of the particulate filter 60, NOx slip characteristics of the LNT 40 at the rich air/fuel ratio, and so on are stored in the controller 70. The adsorbing/oxidizing characteristics of the ammonia according to the inside temperature of the particulate filter 60, the releasing characteristics of the ammonia according to the inside temperature of the particulate filter 60, the NOx slip characteristics of the LNT 40 at the rich air/fuel ratio, and so on may be stored as maps resulting from various experiments.

In addition, the controller 70 may control regeneration of the particulate filter 60 and desulfurization of the LNT 40.

For these purposes, the controller 70 can be realized by one or more processors activated by a predetermined program, and the predetermined program can be programmed to perform each step of the method of controlling a system of purifying an exhaust gas.

Figure 2:
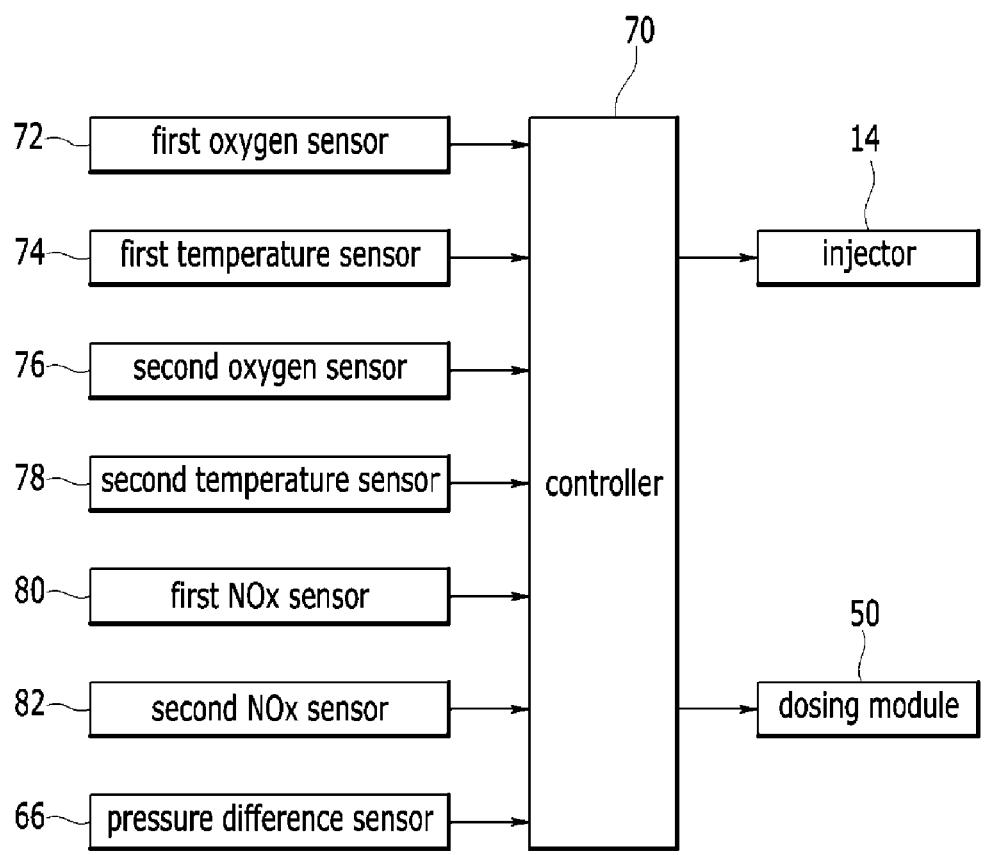
FIG. 2 is a block diagram illustrating a relationship of an input and output of a controller used in a method of controlling a system for purifying an exhaust gas according to an exemplary embodiment of the present disclosure.

FIG. 2 is a block diagram illustrating a relationship of an input and output of a controller used in a method of controlling a system for purifying an exhaust gas according to an exemplary embodiment of the present disclosure.

As shown in FIG. 2, the first oxygen sensor 72, the first temperature sensor 74, the second oxygen sensor 76, the second temperature sensor 78, the first NOx sensor 80, the second NOx sensor 82, and the pressure difference sensor 66 may be electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as lambda ($\lambda$). The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits a signal corresponding thereto to the controller 70.

The second oxygen sensor 76 detects the oxygen amount in the exhaust gas flowing into the particulate filter 60 and transmits a signal corresponding thereto to the controller 70.

The second temperature sensor 78 detects the temperature of the exhaust gas flowing into the particulate filter 60 and transmits a signal corresponding thereto to the controller 70.

The first NOx sensor 80 detects the NOx concentration contained in the exhaust gas flowing into the particulate filter 60 and transmits a signal corresponding thereto to the controller 70.

The second NOx sensor 82 detects the NOx concentration contained in the exhaust gas exhausted from the particulate filter 60 and transmits a signal corresponding thereto to the controller 70.

The pressure difference sensor 66 detects the pressure difference between a front end portion and a rear end portion of the particulate filter 60 and transmits a signal corresponding thereto to the controller 70.

The controller 70 determines the driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and outputs a signal for controlling the injector 14 and the dosing module 50 to the injector 14 and the dosing module 50.

Meanwhile, a plurality of sensors other than the sensors illustrated in FIG. 2 may be mounted in the system of purifying exhaust gas according to the exemplary embodiment of the present disclosure. For better comprehension and ease of description, however, description of the plurality of sensors will be omitted.

Hereinafter, referring to FIG. 3 to FIG. 6, a method of controlling a system for purifying an exhaust gas according to an exemplary embodiment of the present disclosure will be described in detail.

FIG. 3 to FIG. 6 are flowcharts of a method of controlling a system for purifying an exhaust gas according to an exemplary embodiment of the present disclosure.

Figure 3:
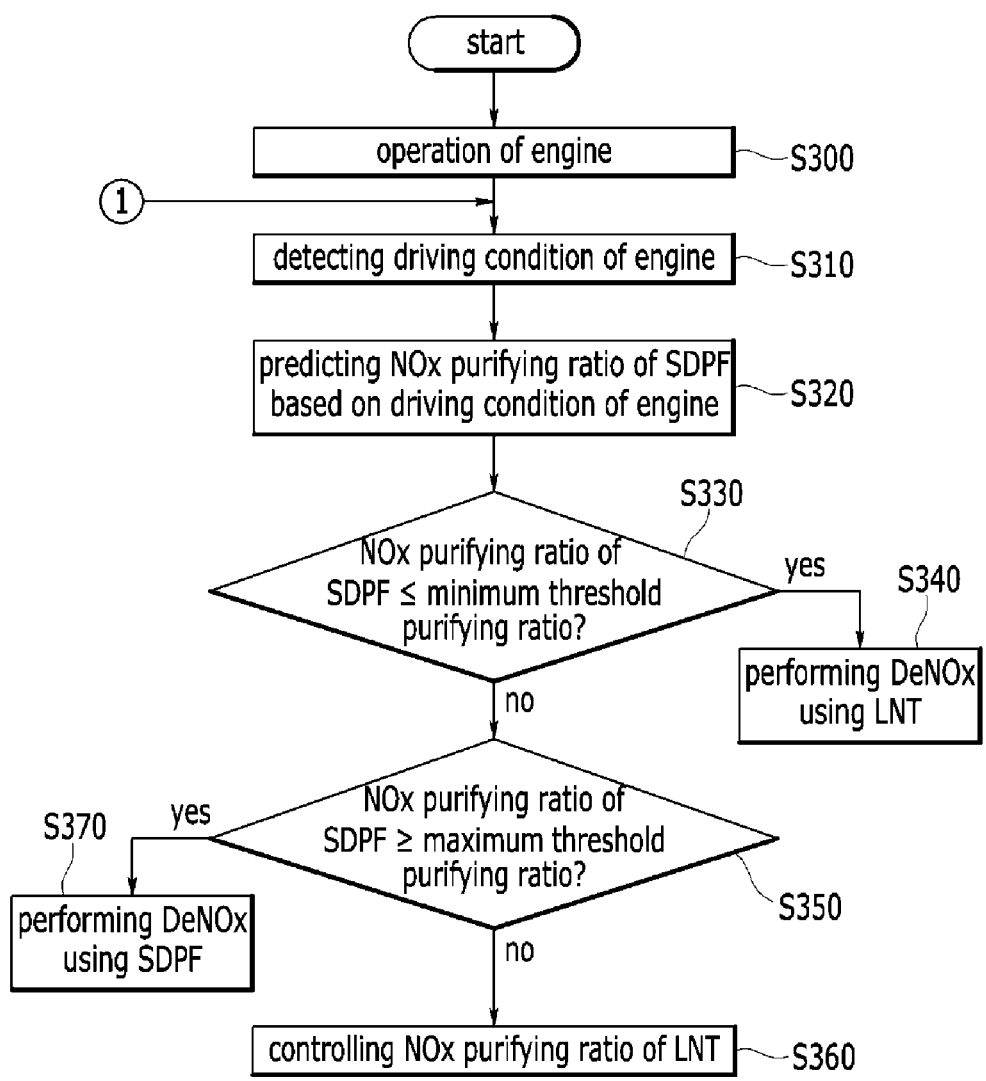
FIG. 3 is a flowchart of a method of controlling a system for purifying an exhaust gas according to an exemplary embodiment of the present disclosure.

As shown in FIG. 3, the method of purifying exhaust gas according to the exemplary embodiment of the present disclosure is executed during operation of the engine 10 at step S300. If the engine 10 is operated, exhaust gas is generated. The generated exhaust gas is purified through the method of controlling the system according to the exemplary embodiment of the present disclosure.

If the engine 10 is operated, the controller 70 detects a driving condition of the engine based on detected values of the sensors 66, 72, 74, 76, 78, 80, and 82 at step S310, and predicts the NOx purifying ratio of the SDPF 60 according to the driving condition of the engine at step S320. That is, the controller 70 predicts a generated NOx amount, a NOx amount adsorbed in the LNT 40, a NOx amount released from the LNT 40, a temperature of the SDPF 60, and so on according to the driving condition of the engine, and predicts the NOx purifying ratio of the SDPF 60.

After that, the controller 70 determines whether the predicted NOx purifying ratio of the SDPF 60 is smaller than or equal to a minimum threshold purifying ratio at step S330. Herein, the minimum threshold purifying ratio is a predetermined value. If the predicted NOx purifying ratio of the SDPF 60 is smaller than or equal to the minimum threshold purifying ratio, a denitrification (DeNOx) using the SDPF 60 is not efficient. Therefore, the controller 70 performs a DeNOx using the LNT 40 at step S340.

Figure 4:
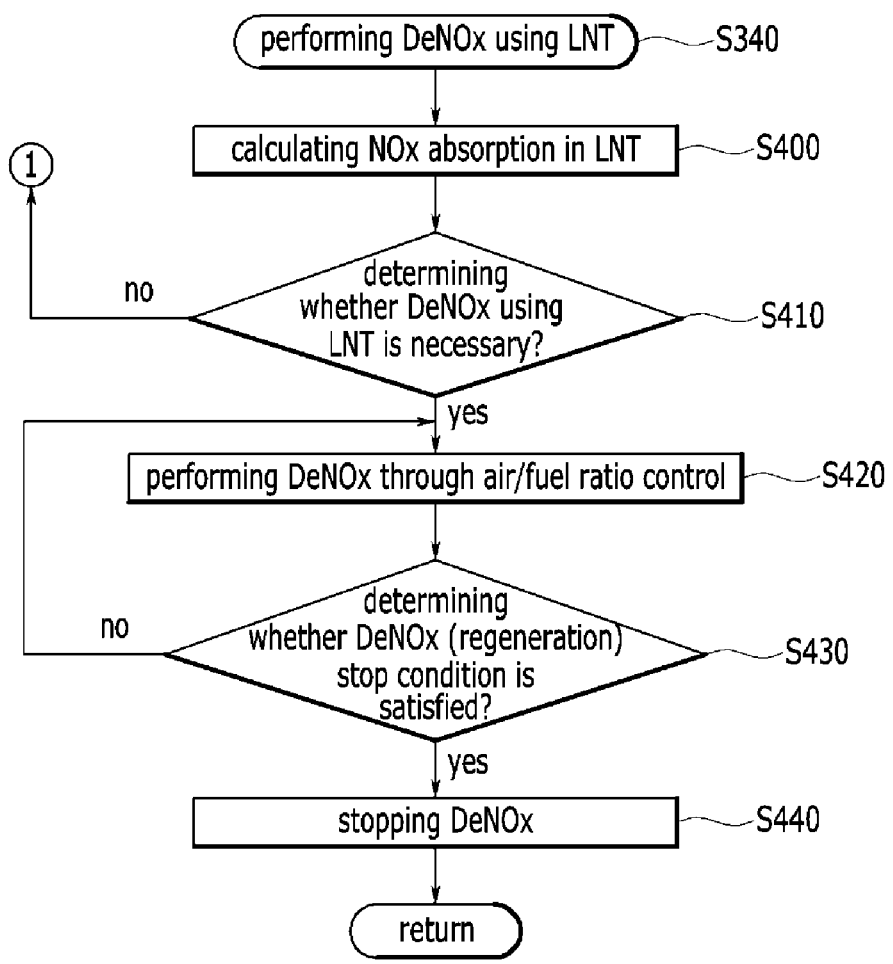
FIG. 4 is a flowchart of step S340 in FIG. 3.

The DeNOx step using the LNT 40 will be described in further detail with reference to FIG. 4.

If the predicted NOx purifying ratio of the SDPF 60 is smaller than or equal to the minimum threshold purifying ratio, the NOx contained in the exhaust gas is adsorbed in the LNT 40 unless the controller 70 controls the air/fuel ratio to be rich. Generally, the predicted NOx purifying ratio of the SDPF 60 is smaller than or equal to the minimum threshold purifying ratio if the temperature of the SDPF 60 is low. In this case, the NOx is easily adsorbed in the LNT 40.

Therefore, the controller 70 may calculate a NOx adsorption amount in the LNT 40 at step S400, and determine whether the DeNOx using the LNT 40 is necessary based on the NOx adsorption in the LNT 40 at step S410. For example, if the NOx adsorption in the LNT 40 is larger than or equal to a predetermined NOx adsorption amount, it may be determined that the DeNOx using the LNT 40 is necessary. In addition, the predetermined NOx adsorption may be predetermined according to a volume and an aging of the LNT 40, a temperature of the exhaust gas, and so on. The predetermined NOx adsorption at step S410 may be constant regardless of the NOx purifying ratio of the SDPF 60.

If it is determined at step S410 that the DeNOx using the LNT 40 is not necessary, the method returns to the step S310. If it is determined at the step S410 that the DeNOx using the LNT 40 is necessary, the controller 70 performs the DeNOx through the control of the air/fuel ratio (regeneration of the LNT) at step S420. That is, the air/fuel ratio is controlled to be rich by controlling an amount and an injection timing of the fuel injected by the injector 14. At this state, the NOx adsorbed in the LNT 40 is released and the released NOx is reduced through a reaction with a reductant (e.g., HC, CO) contained in the exhaust gas.

After that, the controller 70 may determine whether a regeneration stop condition of the LNT 40 is satisfied at step S430. For example, if the NOx adsorption in the LNT 40 is smaller than a minimum NOx adsorption, it may be determined that the regeneration stop condition of the LNT 40 is satisfied. The minimum NOx adsorption may be predetermined according to the volume and the aging of the LNT 40. The minimum NOx adsorption at the step S430 may be constant regardless of the NOx purifying ratio.

Since the step S410 and the step S430 are not related to the DeNOx using the SDPF 60, the predetermined NOx adsorption at the step S410 and the minimum NOx adsorption at the step S430 are constant.

If the regeneration stop condition of the LNT 40 is not satisfied at the step S430, the method returns to the step S420. If the regeneration stop condition of the LNT 40 is satisfied at the step S430, the controller 70 stops the regeneration of the LNT 40 at step S440. That is, the air/fuel ratio that was rich is controlled to be lean (in a normal state).

Referring to FIG. 3, if the predicted NOx purifying ratio of the SDPF 60 is larger than the minimum threshold purifying ratio at the step S330, the controller 70 determines whether the predicted NOx purifying ratio of the SDPF 60 is larger than or equal to a maximum threshold purifying ratio at step S350. Herein, the maximum threshold purifying ratio is a predetermined value. If the predicted NOx purifying ratio of the SDPF 60 is smaller than the maximum threshold purifying ratio, DeNOx simultaneously using the LNT 40 and the SDPF 60 is performed at step S360. At this time, the SDPF 60 is controlled to purify the NOx with its full purification capacity (i.e., all the NOx that can be purified at the SDPF is purified at the SDPF), and the LNT 40 is controlled to purify the NOx that will remain after the DeNOx using the SDPF 60 in advance. That is, a regeneration efficiency (NOx purifying ratio) of the LNT 40 is controlled according to the NOx purifying ratio of the SDPF 60.

Figure 5:
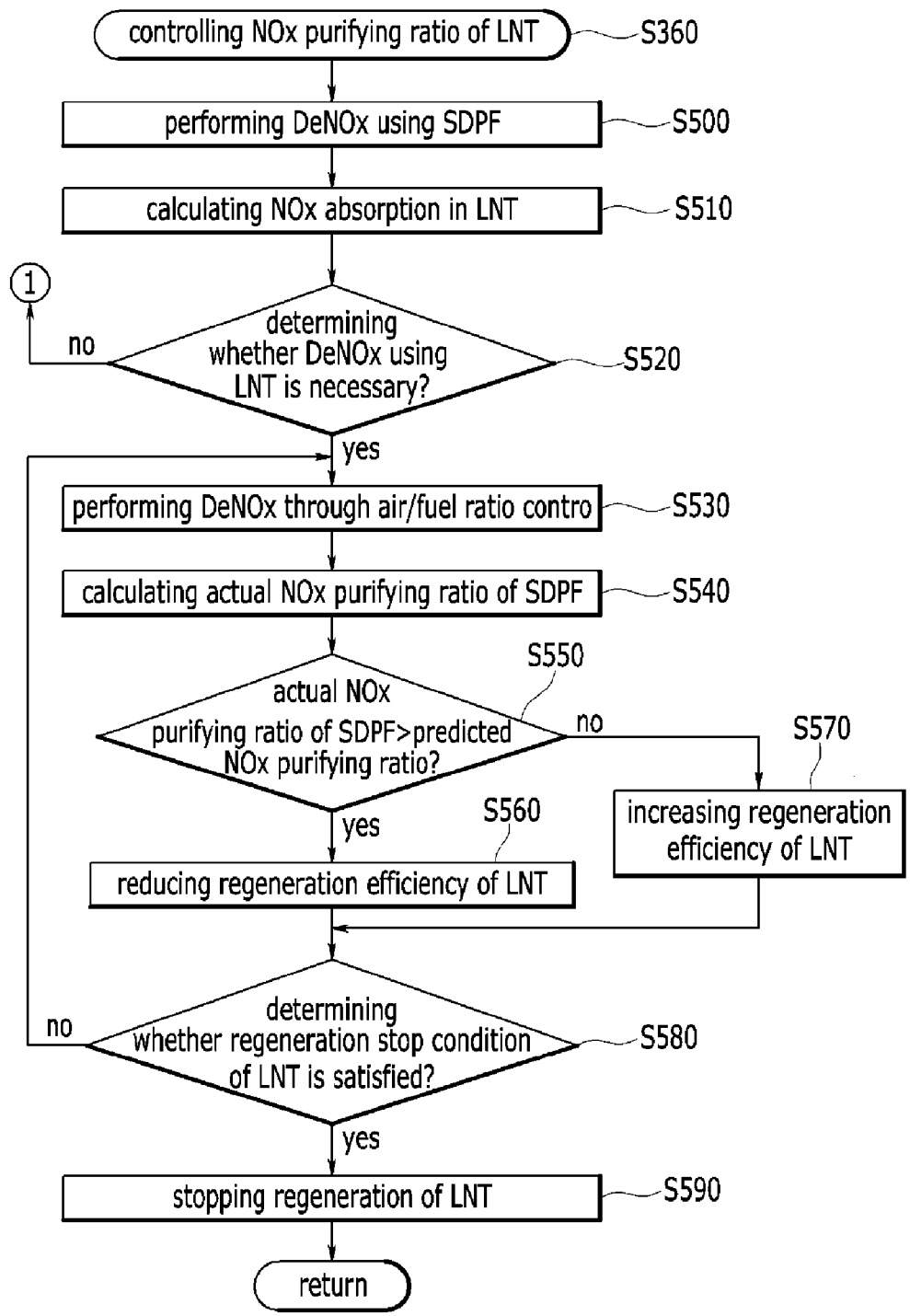
FIG. 5 is a flowchart of step S360 in FIG. 3.

The step of controlling the NOx purifying ratio of the LNT 40 will be described in further detail with reference to FIG. 5.

The NOx is purified by simultaneously using the LNT 40 and the SDPF 60 but is mainly purified by the SDPF 60 at the step of controlling the NOx purifying ratio of the LNT 40. Therefore, the controller 70 performs the DeNOx using the SDPF 60 at step S500. That is, the controller 70 calculates the NOx amount contained in the exhaust gas passing through the SDPF 60 and controls the dosing module 50 to inject the reducing agent according to the NOx amount.

At this state, the controller 70 calculates the NOx adsorption in the LNT 40 at step S510 and determines whether the DeNOx using the LNT 40 is necessary based on the NOx adsorption in the LNT 40 at step S520. For example, if the NOx adsorption in the LNT 40 is larger than or equal to a predetermined NOx adsorption, it may be determined that the DeNOx using the LNT 40 is necessary. In addition, the predetermined NOx adsorption may be predetermined according to the volume and the aging of the LNT 40, the temperature of the exhaust gas, and so on. The predetermined NOx adsorption at the step S520 is changed according to the NOx purifying ratio of the SDPF 60 (see FIG. 7). By doing so, the DeNOx is mainly performed by the SDPF 60 and is auxiliary performed by the LNT 40.

If it is determined that the DeNOx using the LNT 40 is not necessary at step S520, the method returns to step S310. If it is determined that the DeNOx using the LNT 40 is necessary at step S520, the controller 70 performs the DeNOx (regeneration of the LNT) through the control of the air/fuel ratio at step S530. That is, the air/fuel ratio is controlled to be rich by controlling the amount and the injection timing of the fuel injected by the injector 14. At this state, the NOx adsorbed in the LNT 40 is released and the released NOx is reduced through a reaction with the reductant (e.g., HC, CO) contained in the exhaust gas. In addition, a portion of the released nitrogen oxide slips from the LNT 40, enters the SDPF 60, and is reduced at the SDPF 60.

After that, the controller 70 calculates an actual NOx purifying ratio of the SDPF 60 at step S540, and determines whether the actual NOx purifying ratio of the SDPF 60 is larger than the predicted NOx purifying ratio of the SDPF 60 or a value related thereto at step S550. Herein, the actual NOx purifying ratio of the SDPF 60 may be calculated based on the detected values by the first and second NOx sensors 80 and 82, and the value related to the predicted NOx purifying ratio of the SDPF 60 may be calculated by multiplying a predetermined correction coefficient to the predicted NOx purifying ratio of the SDPF 60.

If it is determined at step S550 that the actual NOx purifying ratio of the SDPF 60 is larger than the predicted NOx purifying ratio of the SDPF 60 or the value related thereto, the controller 70 controls to reduce the regeneration efficiency of the LNT 40 at step S560. That is, since the SDPF 60 purifies the NOx more than the target (the NOx purifying ratio of the SDPF 60 is high), the NOx amount purified by the LNT 40 is reduced and the SDPF 60 is controlled to purify more NOx. Herein, the reduction of the regeneration efficiency of the LNT is performed by setting a target lambda to be larger than a predetermined lambda (e.g., 0.95) at regeneration, setting a regeneration duration to be shorter than a predetermined duration, setting a regeneration period to be longer than a predetermined period, or a combination thereof. The regeneration duration means a duration for which a rich signal is output from the controller 70, and a regeneration period means a time interval between consecutive rich signals. If the regeneration duration becomes shortened, a duration for which the rich signal is output becomes shortened. Therefore, a duration for which the air/fuel ratio is rich becomes shortened. In addition, if the regeneration period becomes lengthened, a time interval between a previous rich air/fuel ratio and a next rich air/fuel ratio becomes lengthened. Therefore, the number of rich air/fuel ratios can be reduced. Herein, the target lambda, the regeneration duration and/or the regeneration period may be set according to a difference between the actual NOx purifying ratio and the predicted NOx purifying ratio or the value related thereto.

If it is determined at step S550 that the actual NOx purifying ratio of the SDPF 60 is smaller than or equal to the predicted NOx purifying ratio of the SDPF 60 or the value related thereto, the controller 70 controls to increase the regeneration efficiency of the LNT 40 at step S570. That is, since the SDPF 60 purifies the NOx less than the target (the NOx purifying ratio of the SDPF 60 is low), the NOx amount purified by the LNT 40 is increased and the SDPF 60 is controlled to purify less NOx. Herein, the increase of the regeneration efficiency of the LNT is performed by setting the target lambda to be smaller than the predetermined lambda (e.g., 0.95) at regeneration, setting the regeneration duration to be longer than the predetermined duration, setting the regeneration period to be shorter than the predetermined period, or a combination thereof.

After performing step S560 or step S570, the controller 70 determines whether the regeneration stop condition of the LNT 40 is satisfied at step S580. For example, if the NOx adsorption in the LNT 40 is smaller than the minimum NOx adsorption, it may be determined that the regeneration stop condition of the LNT 40 is satisfied. The minimum NOx adsorption may be predetermined according to the volume and the aging of the LNT 40. The minimum NOx adsorption at step S580 may be changed according to the NOx purifying ratio of the SDPF 60 (see FIG. 7).

If the regeneration stop condition of the LNT 40 is not satisfied at step S580, the method returns to step S530. If the regeneration stop condition of the LNT 40 is satisfied at step S580, the controller 70 stops the regeneration of the LNT 40 at step S590. That is, the air/fuel ratio that was rich is controlled to be lean (in a normal state).

Referring to FIG. 3, if the predicted NOx purifying ratio of the SDPF 60 is larger than or equal to the maximum threshold purifying ratio at step S350, the controller 70 performs the DeNOx using the SDPF 60 at step S370. That is, since the NOx can be sufficiently purified by the SDPF 60, the controller 70 performs the DeNOx using only the SDPF 60.

Figure 6:
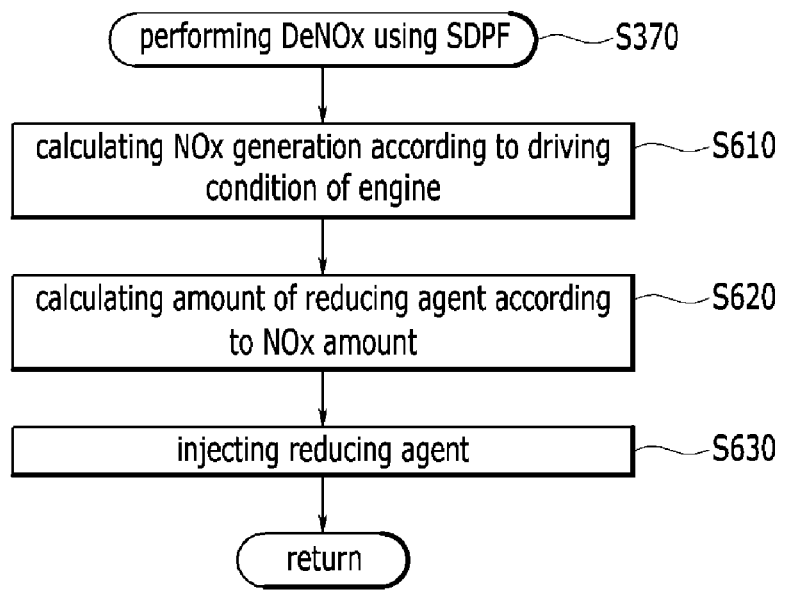
FIG. 6 is a flowchart of step S370 in FIG. 3.

The DeNOx step using the SDPF 60 will be described in further detail with reference to FIG. 6.

In order to perform DeNOx using the SDPF 60, the NOx amount entering the SDPF 60 is calculated. For this purpose, the controller 70 calculates a NOx generation according to a driving condition of the engine at step S610. Since the NOx cannot be adsorbed in the LNT 40 at an operating region where the NOx purifying ratio of the SDPF 60 is larger than or equal to the maximum threshold purifying ratio, the controller 70 assumes that an entirety or a majority of the NOx generation enters the SDPF 60.

After that, the controller 70 may calculate an amount of the reducing agent according to the NOx amount entering the SDPF 60 at step S620, and control the dosing module 50 to inject the reducing agent based on the calculated amount of the reducing agent at step S630.

Figure 7:
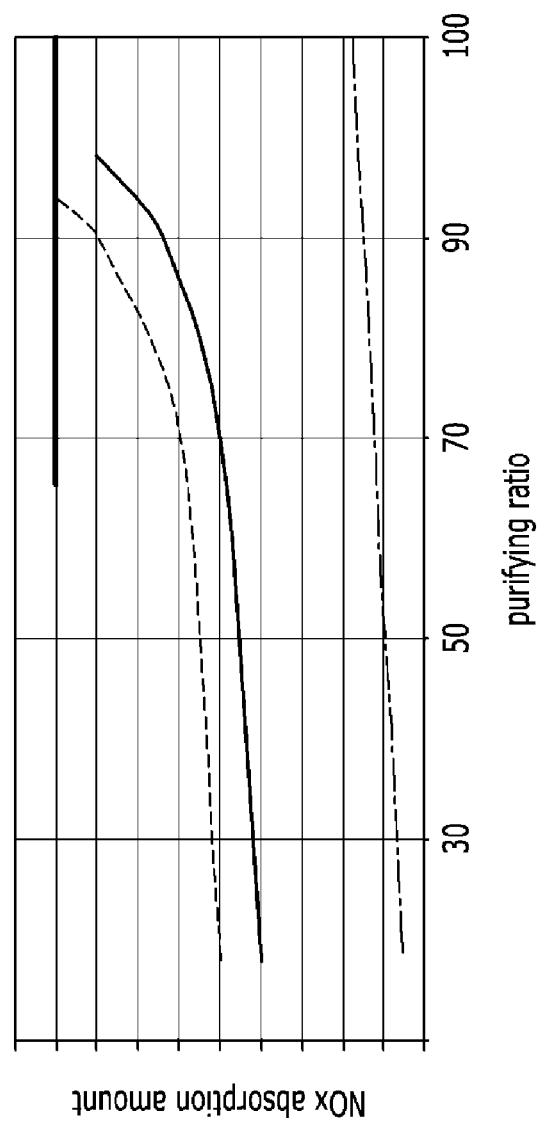
FIG. 7 is a graph illustrating a control method and an effect of an exemplary embodiment of the present disclosure.

FIG. 7 is a graph illustrating a control method and effect of an exemplary embodiment of the present disclosure. The predetermined NOx adsorption (please refer to step S520 in FIG. 5) and the minimum NOx adsorption (please refer to step S580 in FIG. 5) according to the NOx purifying ratio of the SDPF 60 are illustrated in FIG. 7.

The solid line represents the first exemplary embodiment of the predetermined NOx adsorption according to the NOx purifying ratio of the SDPF 60 and the dotted line represents the second exemplary embodiment of the predetermined NOx adsorption according to the NOx purifying ratio of the SDPF 60 in FIG. 7. In the second exemplary embodiment, compared with in the first exemplary embodiment, the SDPF 60 is controlled to purify more NOx. That is, if the second exemplary embodiment and the first exemplary embodiment are compared with each other, the LNT 40 adsorbs more NOx in the second exemplary embodiment under the same NOx purifying ratio of the SDPF 60. Therefore, a regeneration timing of the LNT 40 in the second exemplary embodiment is retarded under the same driving condition, compared with the regeneration timing of the LNT 40 in the first exemplary embodiment, and thereby, fuel consumption may be improved.

The predetermined NOx adsorption is set to increase as the NOx purifying ratio of the SDPF 60 increases. That is, the higher the NOx purifying ratio of the SDPF 60 is, the more the LNT 40 adsorbs the NOx. Therefore, if the NOx purifying ratio of the SDPF 60 is high, the regeneration timing of the LNT 40 is retarded. Therefore, fuel consumption may be improved.

In addition, a one-point chain line in FIG. 7 represents the minimum NOx adsorption according to the NOx purifying ratio of the SDPF 60. The minimum NOx adsorption is set to increase as the NOx purifying ratio of the SDPF 60 increases. That is, even though the NOx purifying ratio of the SDPF 60 is high and the LNT 40 can adsorb the more NOx, the regeneration of LNT 40 is stopped. Therefore, the regeneration duration of the LNT 40 becomes shortened and fuel consumption may be improved.

A bold solid line in FIG. 7 represents the maximum predetermined adsorption of the LNT 40. The maximum predetermined adsorption of the LNT 40 is set to be smaller than the maximum NOx adsorption of the LNT 40. Even though the NOx purifying ratio of the SDPF 60 is high and the LNT 40 can adsorb more NOx, a minimum NOx amount that will be adsorbed by the LNT 40 at cold starting remains. Therefore, the DeNOx of the LNT 40 at the cold starting may be efficiently performed.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for purifying an exhaust gas comprising:
an engine including an injector for injecting fuel thereinto, generating power by burning a mixture of air and the fuel, and exhausting the exhaust gas generated at a combustion process to the exterior thereof through an exhaust pipe;
a lean NOx trap (LNT) mounted on the exhaust pipe for adsorbing nitrogen oxide (NOx) contained in the exhaust gas at a lean air/fuel ratio, releasing the adsorbed nitrogen oxide at a rich air/fuel ratio, and reducing the nitrogen oxide contained in the exhaust gas or the released nitrogen oxide using a reductant including carbon or hydrogen contained in the exhaust gas;
a dosing module mounted at the exhaust pipe downstream of the LNT for directly injecting a reducing agent into the exhaust gas;
a selective catalytic reduction (SCR) catalyst mounted at the exhaust pipe downstream of the dosing module for reducing the nitrogen oxide contained in the exhaust gas using the reducing agent injected from the dosing module; and
a controller for performing a denitrification (DeNOx) share between the LNT and the SCR catalyst according to a driving condition of the engine,
wherein the controller predicts a NOx purifying ratio of the SCR catalyst according to the driving condition of the engine and adjusts a regeneration efficiency of the LNT based on an actual NOx purifying ratio of the SCR catalyst when the predicted NOx purifying ratio of the SCR catalyst is between a minimum threshold purifying ratio and a maximum threshold purifying ratio.

2. The system of claim 1, wherein the controller controls DeNOx using the LNT when the predicted NOx purifying ratio of the SCR catalyst is smaller than the minimum threshold purifying ratio.

3. The system of claim 1, wherein the controller controls DeNOx using the SCR catalyst if the predicted NOx purifying ratio of the SCR catalyst is larger than the maximum threshold purifying ratio.

4. The system of claim 1, wherein the controller adjusts the regeneration efficiency of the LNT based on an actual purifying ratio of the SCR catalyst when the DeNOx using the LNT is necessary during controlling the DeNOx using the SCR catalyst.

5. The system of claim 4, wherein the controller reduces the regeneration efficiency of the LNT when the actual NOx purifying ratio of the SCR catalyst is larger than the predicted NOx purifying ratio of the SCR catalyst or a value related thereto.

6. The system of claim 5, wherein the reduction of the regeneration efficiency of the LNT is performed by setting a target lambda to be larger than or equal to a predetermined lambda at regeneration, setting a regeneration duration to be shorter than a predetermined duration, setting a regeneration period to be longer than a predetermined period, or a combination thereof.

7. The system of claim 4, wherein the controller increases the regeneration efficiency of the LNT when the actual purifying ratio of the SCR catalyst is smaller than or equal to the predicted NOx purifying ratio of the SCR catalyst or a value related thereto.

8. The system of claim 7, wherein the increase of the regeneration efficiency of the LNT is performed by setting a target lambda to be smaller than a predetermined lambda at regeneration, setting a regeneration duration to be longer than a predetermined duration, setting a regeneration period to be shorter than a predetermined period, or a combination thereof.

9. The system of claim 4, wherein the controller determines that the DeNOx using the LNT is necessary when the NOx adsorbed in the LNT is larger than or equal to a predetermined NOx adsorption.

10. The system of claim 9, wherein the predetermined NOx adsorption is set to increase as the predicted NOx purifying ratio of the SCR catalyst increases.

11. The system of claim 4, wherein the controller stops regeneration of the LNT if an LNT regeneration stop condition is satisfied during adjusting the regeneration efficiency of the LNT.

12. The system of claim 11, wherein the LNT regeneration stop condition is satisfied when the NOx adsorbed in the LNT is smaller than a minimum NOx adsorption.

13. The system of claim 12, wherein the minimum NOx adsorption is set to increase as the predicted NOx purifying ratio of the SCR catalyst increases.

14. The system of claim 1, further comprising a particulate filter mounted at the exhaust pipe downstream of the dosing module and trapping particulate matter contained in the exhaust gas,
wherein the SCR catalyst is coated on the particulate filter.

15. A method of controlling a system for purifying an exhaust gas which is provided with a lean NOx trap (LNT) and a selective catalytic reduction (SCR) catalyst, the method comprising:
predicting a NOx purifying ratio of the SCR catalyst according to a driving condition of an engine;
comparing the predicted NOx purifying ratio with a minimum threshold purifying ratio and a maximum threshold purifying ratio;
adjusting a regeneration efficiency of the LNT based on an actual NOx purifying ratio of the SCR catalyst when the predicted NOx purifying ratio is between the minimum threshold purifying ratio and the maximum threshold purifying ratio;
performing DeNOx using the LNT when the predicted NOx purifying ratio is smaller than the minimum threshold purifying ratio; and
performing DeNOx using the SCR catalyst when the predicted NOx purifying ratio is larger than or equal to the maximum threshold purifying ratio.

16. The method of claim 15, wherein the step of adjusting a regeneration efficiency of the LNT based on an actual NOx purifying ratio of the SCR catalyst comprises:
performing DeNOx using the SCR catalyst;
determining whether DeNOx using the LNT is necessary;
performing DeNOx using the LNT if the DeNOx using the LNT is necessary;
calculating the actual NOx purifying ratio of the SCR catalyst;
comparing the actual NOx purifying ratio of the SCR catalyst with the predicted NOx purifying ratio of the SCR catalyst or a value related thereto; and
increasing or reducing the regeneration efficiency of the LNT based on the comparison result.

17. The method of claim 16, wherein the regeneration efficiency of the LNT is reduced if the actual NOx purifying ratio of the SCR catalyst is larger than the predicted NOx purifying ratio of the SCR catalyst or the value related thereto.

18. The method of claim 17, wherein the reduction of the regeneration efficiency of the LNT is performed by setting a target lambda to be larger than or equal to a predetermined lambda at regeneration, setting a regeneration duration to be shorter than a predetermined duration, setting a regeneration period to be longer than a predetermined period, or a combination thereof.

19. The method of claim 16, wherein the regeneration efficiency of the LNT is increased if the actual NOx purifying ratio of the SCR catalyst is smaller than or equal to the predicted NOx purifying ratio of the SCR catalyst or the value related thereto.

20. The method of claim 19, wherein the increase of the regeneration efficiency of the LNT is performed by setting a target lambda to be smaller than a predetermined lambda at regeneration, setting a regeneration duration to be longer than a predetermined duration, setting a regeneration period to be shorter than a predetermined period, or a combination thereof.

* * * * *